United States Patent [19]

Toy et al.

[11] Patent Number: 5,177,740
[45] Date of Patent: Jan. 5, 1993

[54] FRAME/SLOT SYNCHRONIZATION FOR U.S. DIGITAL CELLULAR TDMA RADIO TELEPHONE SYSTEM

[75] Inventors: Raymond L. Toy, Latham; Sandeep Chennakeshu, Clifton Park, both of N.Y.

[73] Assignee: General Electric Company, Schenectady, N.Y.

[21] Appl. No.: 754,108

[22] Filed: Sep. 3, 1991

[51] Int. Cl.⁵ ............................................. H04J 3/06
[52] U.S. Cl. .............................. 370/100.1; 370/95.3; 370/105.1; 370/105.4; 375/108; 375/116; 340/825.14
[58] Field of Search ............... 370/100.1, 105.1, 105.4, 370/105.5, 95.3; 340/825.14; 375/108, 109, 116

[56] References Cited

U.S. PATENT DOCUMENTS

| | | | |
|---|---|---|---|
| 4,002,845 | 1/1977 | Kaul et al. | 370/105.1 |
| 4,852,090 | 7/1989 | Borth | 370/104.1 X |
| 4,984,249 | 1/1991 | Long et al. | 375/109 X |
| 5,005,190 | 4/1991 | Itoi | 375/108 |
| 5,016,206 | 5/1991 | Shinonaga | 375/116 X |

OTHER PUBLICATIONS

"Design and Performance of Synchronization Techniques and Viterbi Adaptive Equalizers for Narrowband TDMA Mobile Radio", G. D'Aria and V. Zingarelli, Proceedings of Third Nordic Seminar on Digital Land Mobile Radio Communication, Copenhagen, Denmark, Sep. 13-15, 1988.

Primary Examiner—Douglas W. Olms
Assistant Examiner—Russell Blum
Attorney, Agent, or Firm—Lawrence P. Zale; Marvin Snyder

[57] ABSTRACT

Frame/slot synchronization is applied to a received Time Division Multiple Access (TDMA) signal and a temporal position of a reference feature is acquired, such as a synchronizing bit stream or preamble, associated with a desired time slot. The desired time slot is but one of a plurality of time slots that comprise a frame. Verification that the acquired temporal position corresponds to the desired time slot is performed by repetitively estimating a temporal position of the reference feature in a subsequent frame and sampling the subsequent frame at the estimated temporal position to determine if the reference feature is present. The temporal position of the reference feature of the desired time slot relative to the frame is maintained over a plurality of received frames.

12 Claims, 4 Drawing Sheets fig. 1 fig. 2 fig. 3a fig. 3b fig. 3c fig. 4

FRAME/SLOT SYNCHRONIZATION FOR U.S. DIGITAL CELLULAR TDMA RADIO TELEPHONE SYSTEM

RELATED APPLICATIONS

This application is related to the following U.S. patent applications which are filed concurrently herewith and assigned to the present assignee:

S. Chennakeshu et al. Ser. No. 754,105, "Decision Feedback Equalization for Digital Cellular Radio";

H. Lester et al. Ser. No. 754,471, "Automatic Simulcast Alignment";

S. Chennakeshu et al. Ser. No. 753,578, "Adaptive MLSE-VA Receiver for Digital Cellular Radio"; and S. Chennakeshu et al. Ser. No. 753,579, "Order Recursive Lattice Decision Feedback Equalization for Digital Cellular Radio".

FIELD OF THE INVENTION

This invention relates generally to telecommunication method and apparatus and, in particular, to method and apparatus for achieving frame/slot synchronization in a Time Division Multiple Access (TDMA) cellular radio telephone system.

BACKGROUND OF THE INVENTION

A digital cellular radio telephone system that is proposed for use in the United States employs TDMA as a channel access method. For this proposed system data is transmitted in frames, each of which comprises three or six user time slots. Each user time slot is uniquely identified by a reference feature, or sequence of symbols referred to as a preamble to which is typically appended a data portion.

A transmission standard (IS-54) proposed for use with the U.S. digital cellular radio telephone system uses a TDMA frame structure. Each TDMA frame has a duration of 40 msec and comprises six time slots, each having a duration of 6.67 msec. Each frame is comprised of 1944 bits, or 972 symbols, where each symbol is comprised of two bits, for a gross transmission rate of 48.6 Kbits/sec. Each time slot contains a 28 bit preamble which is a carefully chosen bit sequence used for synchronization. The remainder of the time slot contains digitized voice data along with several bits necessary for guard time, in-band signalling (i.e., slow associated control channel or SACCH) and a digital verification color code (DVCC). Each time slot is generally assigned to one user.

In such a system, and prior to detecting the transmitted data portion, it is necessary to identify and locate the beginning of the assigned time slot. This is accomplished by identifying the start of the TDMA frame and then identifying the start of the desired time slot within the frame. The identification of the start of the frame and time slot is referred to as synchronization.

The TDMA frame structure is such that the identification of a particular time slot marks the beginning of a particular user's data frame. Hence the term frame/slot synchronization is used herein as opposed to differentiating the method into separate frame and time slot synchronization tasks.

After reception of the serial data stream a demodulator produces a baseband signal that comprises a stream of (I,Q) samples representing the in-phase (I) and quadrature (Q) components of the received signal. These received samples are used to establish frame and slot synchronization.

One known synchronization method involves locating a peak of a correlation between a known preamble and the corresponding received sequence in a particular time slot. The underlying concept of this method is referred to herein as a correlation peak search. As was stated, each time slot in the TDMA frame is identified by a unique reference feature or preamble. The preamble symbols are chosen such that their autocorrelation sequence resembles white noise, with cross-correlation between preambles being very low. On an error-free channel, the high autocorrelation and low cross-correlation between the preambles provides for discrimination between the time slots. Thus an autocorrelation sequence similar to white noise provides for locating the precise beginning of the preamble.

One technique for obtaining frame/slot synchronization for a TDMA system that is representative of the method employed in the CEPT/GSM (European) digital cellular system is discussed by G. D'Aria and V. Zingarelli in "Design and Performance of Synchronization Techniques and Viterbi Adaptive Equalizers for Narrowband TDMA Mobile Radio", Proceedings of Third Nordic Seminar on Digital Land Mobile Radio Communication, Copenhagen, Denmark, 9/13-15/88. The synchronization method described therein is based on the previously mentioned correlation peak search.

However, there are several significant differences between the CEPT/GSM system and the U.S. digital cellular system. These include the type of modulation, filtering, and data rate, all of which require modifications to the correlation peak search synchronization method. These differences between systems manifest themselves as requiring a different method of frame/slot timing acquisition and a different method for subsequent maintenance of this timing.

It is thus an object of the invention to provide method and apparatus for achieving and maintaining frame acquisition in the U.S. digital cellular radio system.

It is a further object of the invention to provide a simplified, relative to the prior art, method and apparatus for achieving and maintaining frame acquisition in the U.S. digital cellular radio system.

It is another object of the invention to provide method and apparatus for achieving and maintaining frame acquisition in the U.S. digital cellular radio system that performs a correlation between a reference sequence of symbols and a corresponding received sequence forming a portion of a particular time slot, the correlation peaks thus obtained being processed to lower the probability of an occurrence of a false alarm and/or a false lock.

SUMMARY OF THE INVENTION

The foregoing problems are overcome and the objects of the invention are realized by a relatively uncomplicated frame/slot synchronization method and apparatus for realizing same. The invention performs a correlation between a reference sequence of symbols and a received sequence of symbols that are a part of a particular time slot. Correlation peaks thus obtained are further processed to reduce probability of false alarm and false lock indications.

The invention contemplates a method for applying frame/slot synchronization to a Time Division Multiple Access (TDMA) signal, including the steps of receiving the TDMA signal, acquiring, out of a plurality of time slots that comprise a frame, a temporal position for a reference feature associated with a desired time slot, and verifying that the acquired temporal position corresponds to the desired time slot. The step of verifying includes the repetitively executed steps of estimating a temporal position of the reference feature in a subsequent frame and sampling the subsequent frame at the estimated temporal position to determine if the reference feature is present. The method further includes maintaining the temporal position of the reference feature of the desired time slot relative to the frame over a plurality of received frames.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

DETAILED DESCRIPTION OF THE INVENTION

Figure 1:
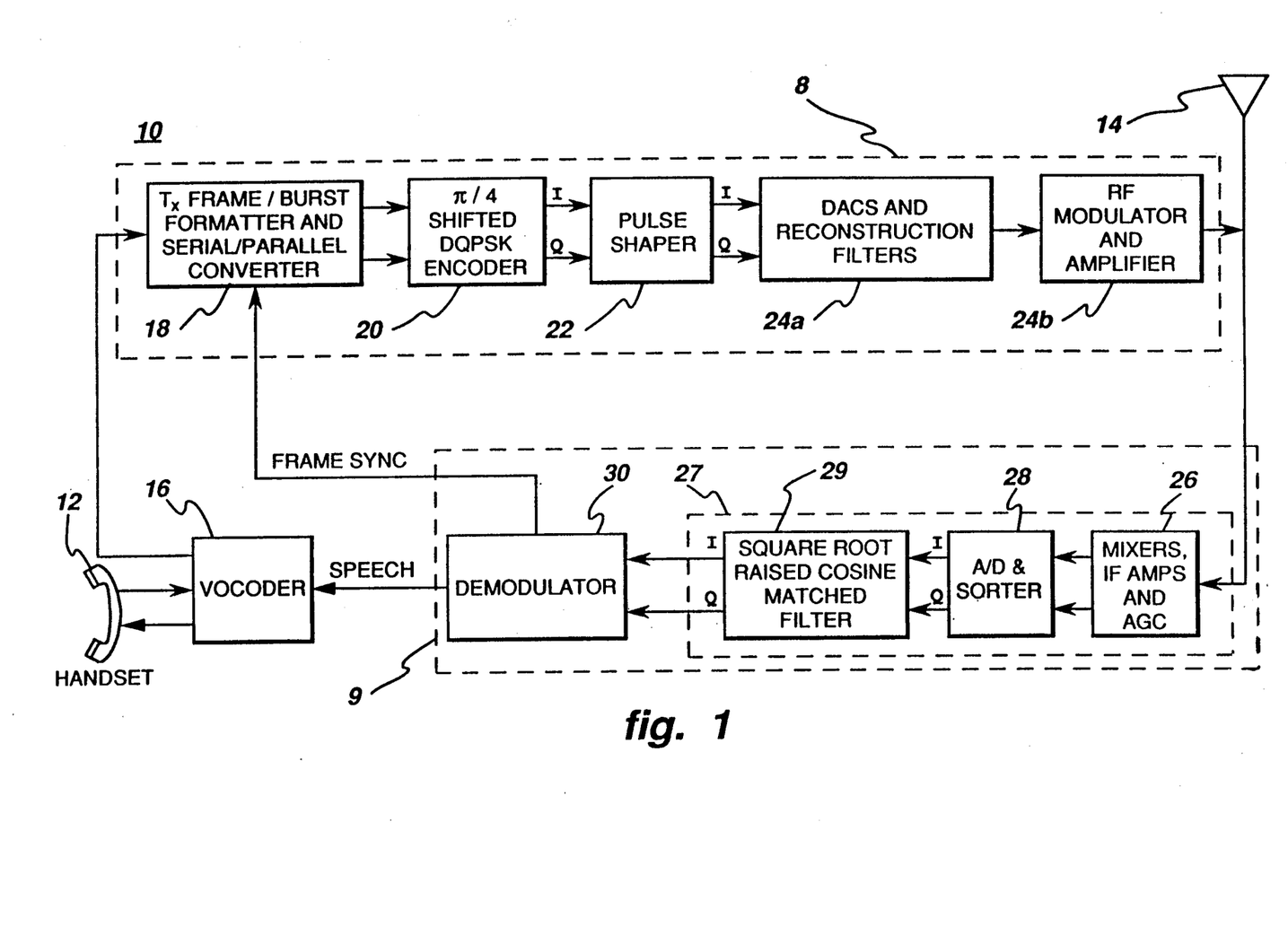
FIG. 1 is a simplified block diagram of a digital cellular radio telephone system that is constructed and operated in accordance with the invention.

FIG. 1 illustrates, in block diagram form, a digital cellular radio system 10. System 10 includes a transmitter section 8 and a receiver section 9. In the preferred embodiment, a handset 12 supplies input and output audio information and an antenna 14 transmits an 824-849 MHz modulated RF carrier signal and receives an 869-894 MHz modulated RF signal, each signal being communicated in a channel of 30 KHz bandwidth. System 10 may be installed in a motor vehicle and function as a mobile telephone. Alternatively, system 10 may be constructed for use as a hand held radio or as a portable radio unit that can be carried by a user (e.g., in a back-pack). A base station also includes apparatus configured substantially as shown.

A vocoder 16 is coupled to handset 12 and includes an A/D converter for converting an audio signal generated by the handset 12 microphone to a digital bit serial pulse stream. The output signal of vocoder 16 is supplied to a transmitter (Tx) frame/burst formatter 18. The formatted digital data are converted to parallel form and applied to a π/4-Shifted-Differentially Encoded Quadrature Phase Shift Keying (DQPSK) encoder 20. In-phase (I) and quadrature (Q) component output signals of encoder 20 are applied to a Nyquist square root raised cosine pulse shaper 22. Formatter 18, encoder 20 and pulse shaper 22 together function as a digital modulator. The pulse-shaped I and Q output signals of shaper 22 are applied to an analog signal reconstruction circuit 24a that comprises D/A converters and reconstruction filters for converting the shaped I and Q digital information to analog signals for modulating the RF carrier. The modulated RF carrier, produced by an RF modulator and amplifier circuit 24b, is transmitted by antenna 14.

Vocoder 16 receives a digital pulse stream from receiver 9 and includes a D/A converter for converting this input pulse stream to an analog speech signal that drives a handset 12 speaker. The receiver includes a circuit 26 having frequency mixers, IF amplifiers and an Automatic Gain Control (AGC) circuit, whereby a received RF signal is converted to an IF signal. A high speed A/D converter circuit 28 includes, preferably, a flash A/D converter for converting the IF signal to digital form, and a sorter which separates the converted digital IF signal into its I and Q components for application to a square root raised cosine filter 29 that is matched to the transmitter pulse shaper 22. The output signal of filter 29 is supplied to a baseband data demodulator 30 which processes the I and Q received signals to extract the speech information for application to vocoder 16. Another important task of demodulator 30 is to process the incoming received signal to achieve and maintain frame/slot synchronization. This function is accomplished in the manner described, infra. Frame/slot synchronization information is also provided to frame/burst formatter 18 for use in synchronizing the transmitted information to the frame/slot timing. Those skilled in the art will appreciate that matched filter 29 is optional and may be eliminated at the expense of some degradation in receiver operation.

Figure 2:
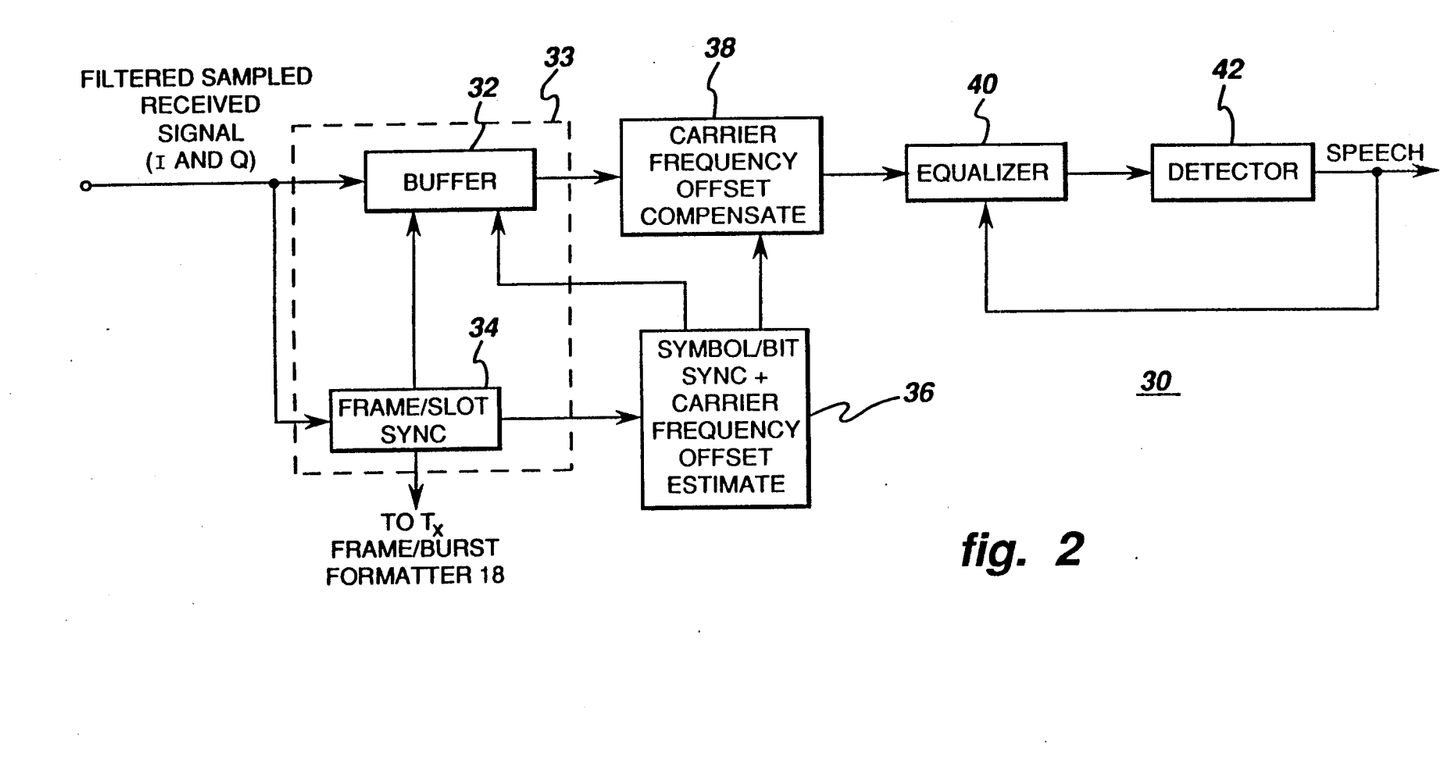
FIG. 2 is a block diagram that illustrates in greater detail the demodulator of FIG. 1.

As shown in greater detail in FIG. 2, demodulator 30 includes an input buffer 32 and a frame/slot synchronizer 34, each of which receives the I and Q digital data provided by the A/D converter and sorter circuit 28, via filter 29 if provided. A carrier frequency offset compensation circuit 38 compensates for carrier frequency errors (due to slightly mismatched oscillator (RF) frequencies at the mobile and base station), while symbol timing adjustment is performed by circuit 36, equalization is performed by equalizer 40, and detection is performed by detector 42. Equalizer 40 is essential when delay spreads exceed a third of the symbol period, or approximately 14 microseconds for the U.S. digital cellular system. In many urban areas the delay spread is less than 14 microseconds and the equalizer may be eliminated. For those applications that require the equalizer, a presently preferred embodiment relies on an adaptive equalizer design. However, for either demodulator embodiment, i.e., with or without equalizer 40, the frame/slot synchronization is performed identically. Symbol timing and carrier frequency error compensation functions are performed in accordance with the type of demodulator 30.

The system 10 of FIG. 1 may be implemented in any of a number of suitable embodiments, including discrete component circuits, digital signal processors, and combinations thereof. A means 27 for receiving a TDMA signal is comprised of elements 14, 26, 28 and 29. In a presently preferred embodiment, vocoder 16 and the digital modulator, including formatter 18, encoder 20 and pulse shaper 22, are each implemented with a digital signal processor of the type designated TMS320C25, while demodulator 30 is implemented with a digital signal processor of the type designated TMS320C30. The TMS320-type digital signal processors, including application and programming information, are available from Texas Instruments, Incorporated. However, the invention is not to be construed to be limited to any one specific hardware or software embodiment.

Regarding a portion of the broadband data demodulator 30, specifically a presently preferred embodiment of the frame/slot synchronizer 34 of FIG. 2, an underlying simplicity results from separating the frame/slot synchronization from symbol synchronization. Such separation allows the use of a lower number of samples per symbol and hence reduces computational load. Elements 32 and 34 act as a means 33 for acquiring a temporal position of a synchronization reference. Element 36 acts as a means for estimating a temporal position of a synchronization reference, and element 38 acts as a means for adjusting the estimated temporal position of a synchronization reference. In a presently-preferred embodiment of the invention, frame/slot synchronization is established to within one half of a symbol of the desired timing.

The method employed for establishing frame/slot synchronization operates in two broad steps: a frame/slot acquisition step and a frame/slot tracking or maintenance step. In the acquisition step, the signal is received and an attempt is made to locate the actual beginning of a frame/slot. Once a frame/slot is acquired, the method enters the tracking step where each frame/slot position is tracked despite timing variations due to channel-induced anomalies such as delay spread variation, fading, etc.

Figures 3A, 3B:
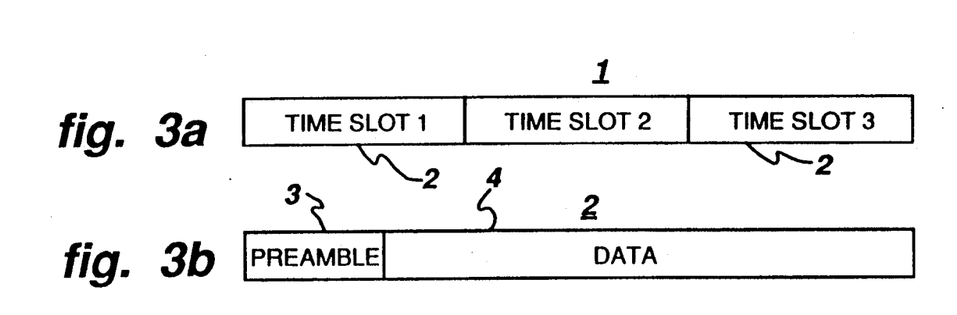
FIGS. 3a, 3b and 3c diagrammatically illustrate an arrangement of time slots in a frame, the temporal position of the preamble relative to the data portion of an experimental time slot, and a frame/time slot structure, respectively.

As shown in FIGS. 3a and 3b, the digital cellular radio telephone system that is proposed for use in the United States transmits data in frames 1, each of which comprises three or six user time slots 2. Each user time slot 2 is uniquely identified by a preamble 3 to which is typically appended a data portion 4.

Figure 3C:
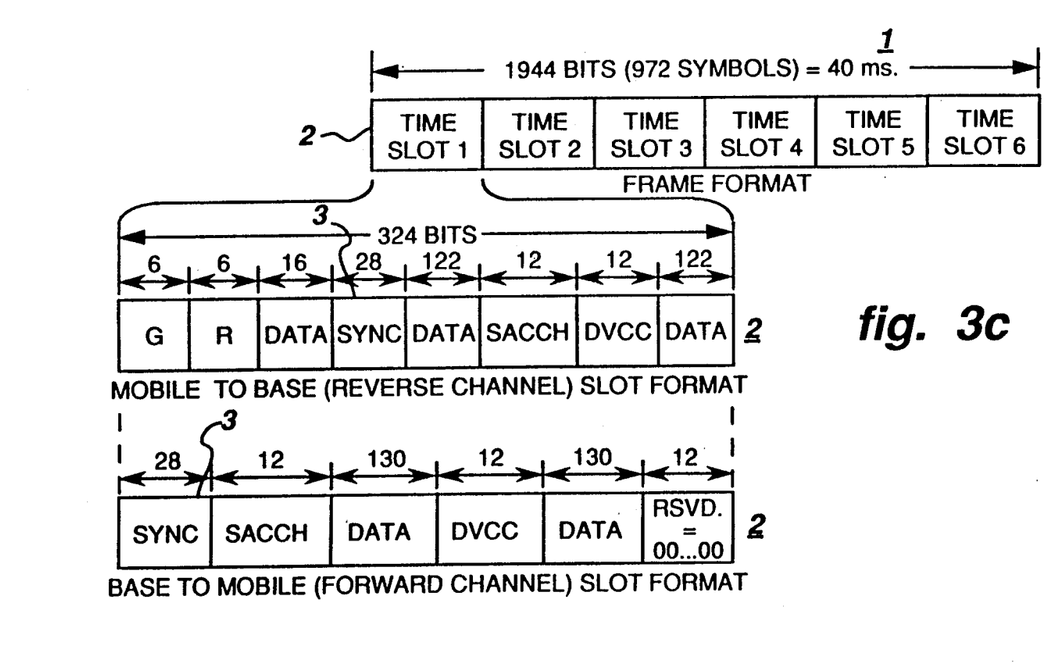

Transmission standard (IS-54) proposed for use with the U.S. digital cellular radio telephone system uses a TDMA frame structure as shown in FIG. 3c. Each TDMA frame 1 has a duration of 40 msec and comprises six time slots 2 each having a duration of 6.67 msec. Each frame 1 is comprised of 1944 bits, or 972 symbols, where each symbol is comprised of two bits, for a gross transmission rate of 48.6 Kbits/sec. Each time slot 2 contains a 28 bit sequence as preamble 3 which is used for synchronization. The remainder of time slot 2 contains digitized voice data along with several bits necessary for guard time G and R, in-band signalling (SACCH) and verification code (DVCC). Each time slot 2 is generally assigned to one user.

Prior to detecting the transmitted data portion 4 (FIG. 3b), the beginning of the assigned time slot is identified and located by identifying the start of TDMA frame 1 and then identifying the start of the desired time slot 2 within frame 1.

After reception of the serial data stream demodulator 30 of FIGS. 1 and 2 produces a baseband signal that comprises a stream of I,Q samples representing the I and Q components of the received signal. These received samples are used to establish frame and slot synchronization, as by use of a correlation peak search. As evident in FIG. 3c, each time slot 2 in TDMA frame 1 is identified by a unique reference feature or preamble 3. On an error-free channel, the high autocorrelation and low cross-correlation between preambles 3 provides for discrimination between the time slots 2. Thus an autocorrelation sequence similar to white noise provides for locating the precise beginning of preamble 3.

A correlation is a basic operation of the frame/slot synchronization. Assume R(n) is a complex signal consisting of I and Q samples from the received information and $S_i(n)$ be the corresponding preamble sequence of the $i^{th}$ time slot. As a first step, a normalized cross-correlation is determined between the preamble sequence and the corresponding received sequence, and can be expressed as:

$$T(n) = \frac{|E[R(n) S_i^*(n)]|^2}{E[|R(n)|^2]E[|S_i(n)|^2]}, \quad (1)$$

where E[.] represents an ensemble average, the symbol * represents complex conjugate, and n represents the time index of a sample. Normalization by the received signal energy is important since it removes fluctuations due to signal strength fading.

The basic metric expressed in equation (1) computes the normalized magnitude squared correlation between the preamble and received sequence. If, instead, the basic metric employed is a normalized correlation, it is necessary to subsequently obtain the square root of the quantity computed by equation (1). However, the square root operation is computationally expensive and is preferably avoided by using, as the basic metric, the relationship expressed by equation (1).

In practice, the ensemble average is replaced by a time average and equation (1) is replaced by:

$$T(n) = \frac{\left|\sum_{k=0}^{N-1} R(n+k)S_i^*(k)\right|^2}{\sum_{k=0}^{N-1} |R(n+k)|^2 \sum_{k=0}^{N-1} |S_i(k)|^2}, \quad (2)$$

where N is the number of samples used over the preamble sequence, R(n+k) is a complex signal consisting of in-phase and quadrature samples derived from the received signal, and $S_i(k)$ is a predetermined symbol sequence of the $i^{th}$ time slot.

In equation (2) the normalization comprises two components which represent the energy in the received sequence, $$E_R(n) = \sum_{k=0}^{N-1} |R(n+k)|^2,$$

and the energy in the preamble sequence, $$E_S(n) = \sum_{k=0}^{N-1} |S_i(k)|^2.$$

$E_S(n)$ may be precomputed and stored since the preamble sequence is known. The energy in the received sequence may be computed as an average over a rectangular window of n samples as in equation (2), or as follows:

$$E_R(n) = \lambda E_R(n-1) + |R(n)|^2, \quad (3)$$

where λ, which constitutes a smooth or weighting factor, is chosen to be between 0.95 and 1.

Figure 4:
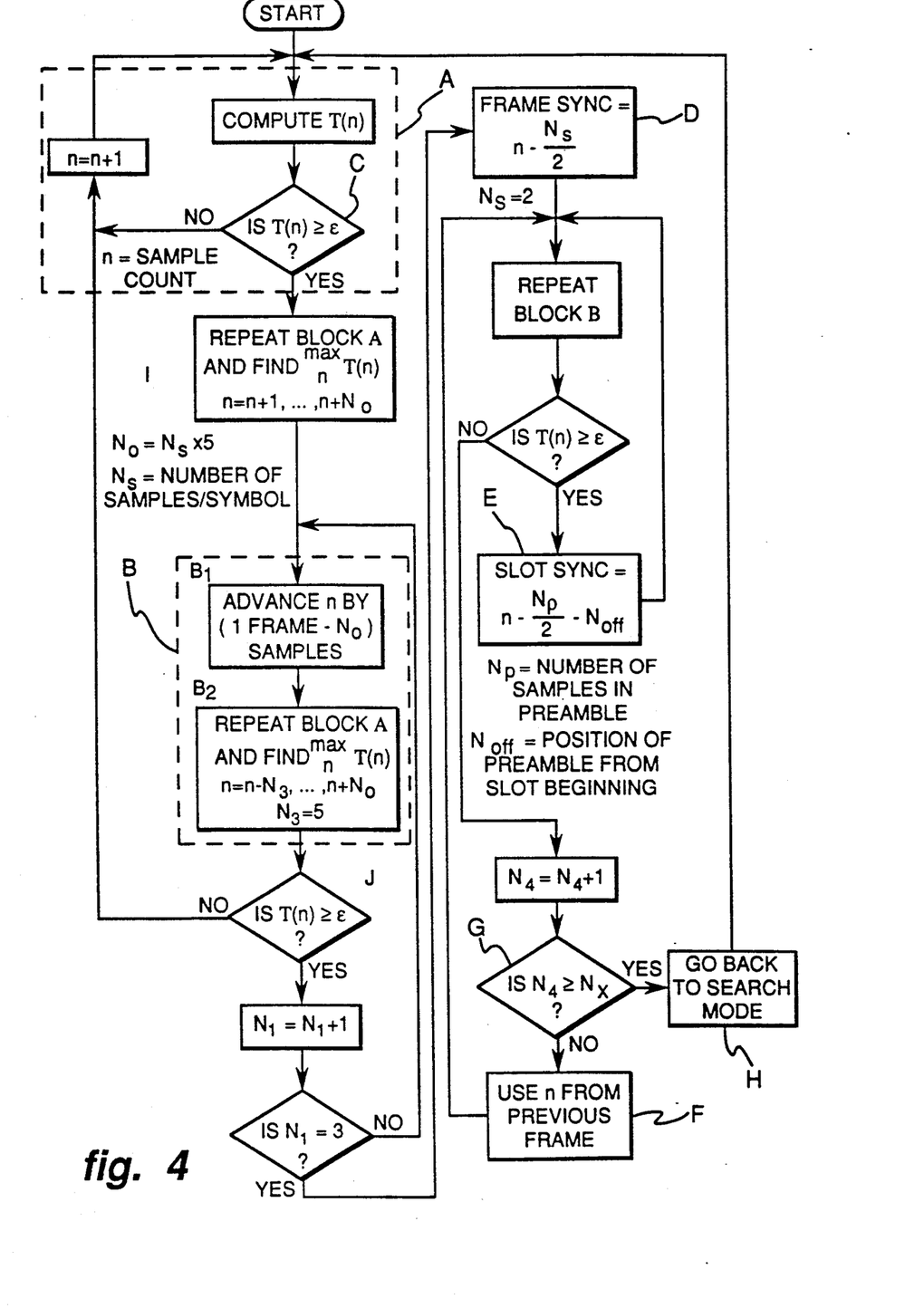
FIG. 4 is a flow chart representing an embodiment of a presently preferred method of the invention.

In the flow chart for the synchronization method of the invention, shown in FIG. 4, at Block A, T(n) is determined as in equation (2) and, if T(n) <ϵ, then sample count n is incremented by 1 and T(n) is again examined to determine if it is ≧ϵ. If T(n) ≧ϵ for some threshold ϵ, the method indicates that a significant correlation peak is located at time t=n. This time instant is recorded as a possible starting point of a frame/slot.

The corresponding value of T(n) is also stored as a reference value to be used subsequently. In order to reduce the probability of a false alarm the method (at block I) determines T(n) for several samples ahead of the recorded starting position of the frame/slot. These values of T(n) are compared with the reference value of T(n) and the sample instant at time t=n, corresponding to the largest value of T(n), is chosen as the starting position of a frame/slot. The choice of the threshold value depends on several factors, including the type of modulation and pulse shaping, channel noise, and the length of the preamble.

Once having found a possible frame/slot starting point, the method switches to a verification phase (Block B). In this phase the method executes an estimate of where the time slot in the next frame should occur, since the length of a TDMA frame is known (block $B_1$). The correlation defined by equation (2) is performed at sample points within a region near the estimated frame/slot location (Block $B_2$). If another correlation peak is not found (Block J) a false alarm is declared and the method reenters the search phase and begins once more searching for a starting position of the frame/slot. However, if a correlation peak that exceeds the threshold is found at the estimated location, the method advances to a next possible frame location to look for yet another correlation peak. This process is repeated until either: (a) the method locates (i.e., finds) $N_1$ correlation peaks in sequence at predicted correlation peak locations, where $N_1$ is desired number of found peaks, or, (b) the method locates $N_1$ peaks out of a possible $N_2$ peaks at predicted correlation peak locations, where $N_2$ is number of slots to be searched for peaks. Either of these conditions being satisfied causes the method to indicate that a frame/slot has been acquired (Block D). That is, the temporal position of the preamble 3 of a desired time slot 2 within the frame 1 of FIG. 3c is accurately known.

Having acquired a candidate frame/slot location, the method enters a maintenance mode. In this mode, the method performs correlations in a neighborhood of $\pm N_3$ samples about the candidate frame location. For the embodiment described herein, $N_3$ equals five. These additional correlations that are performed around the candidate frame location have been found to be important to account for any impairments in the transmitter, channel, or receiver, such as jitter and time delay. A sample corresponding to the highest correlation peak located within this sample neighborhood is taken to be the starting position of the preamble. Since the position of the preamble in a slot is known, the start of the slot can be determined from the location of the preamble by using, for example, a counter (Block E). If, however, a significant correlation peak is not located, the method attempts to use a best estimate of the desired time slot location. This estimate is taken to be the location estimated from the previous frame (Block F). If, however, a significant peak is not found in $N_x$ slots (Block G) where a peak is expected ($N_x$ being the number of consecutively missed peaks before declaring lost synchronization), the method returns to the search mode (Block H) and attempts to reacquire frame/slot synchronization.

A present TDMA frame structure, as shown in FIG. 3a, supports three users all using the same data rate. In a further embodiment of the TDMA frame structure, as depicted in FIG. 3c, there are six time slots supporting users employing half and full data rates. The half-rate users are assigned one slot per frame, while the full-rate users are assigned two slots per frame. Thus, each full-rate user has two identifying preambles corresponding to the two assigned time slots. In this case the synchronization method of the invention employs one of the associated preambles to search and locate a frame. However, in the maintenance mode both preambles are used, in an alternating manner, to maintain synchronization to the corresponding time slots, as was described for the case where a single preamble is used.

The method of the invention was implemented and tested over a simulated mobile radio channel with the simplified TDMA frame structure illustrated in FIG. 3b. The system used a $\pi/4$-shifted-DQPSK modulation scheme with a raised-cosine pulse shape. The receiver produced 20 (I,Q) samples per symbol Every $10^{th}$ sample was used to acquire and maintain frame/slot synchronization. The synchronization was found to be accurate to within $\pm 5$ samples ($\frac{1}{4}$ of a symbol with two samples per symbol) of the desired result. Fine tuning of the synchronization is required only to recover symbol timing. This may be accomplished by the demodulator 30 (FIGS. 1 and 2) through use of a high oversampling factor.

The implemented system employed six different preamble sequences, one for each time slot, each having 13 symbols (26 bits). These preamble sequences were formed from the eight 26 bit preamble sequences adopted for the CEPT/GSM system; however, the teachings of the invention are equally applicable to 28 bit preamble sequences such as used in the U.S. digital cellular standard.

The eight CEPT/GSM preamble sequences were paired and concatenated to form the four preamble sequences for use in the implementation. The remaining two preamble sequences were formed by randomly selecting two of the eight GSM sequences and concatenating the two selected sequences. The preamble sequences thus formed were not optimum but nevertheless operated satisfactorily with the system of the invention.

The correlation threshold value was selected to be 0.5 in that, even under noiseless conditions, the correlation peak was found to rarely exceed 0.8. Under very noisy conditions, the correlation peaks were found to be generally below 0.4.

Frame synchronization was indicated when three successive correlation peaks were encountered ($N_1 = 3$). This value was chosen through experimentation. It was found that using but one peak resulted in generation of an excessive number of false alarms. However, using more than three successive peaks did not greatly improve performance. In fact, performance was found to decrease because of the need to verify synchronization with a larger number of successive peaks. This decrease in performance occurs because signal fading causes some of the correlation peaks to be missed, the frequency of missed correlation peaks increasing with the requirement of locating a larger number of successive peaks.

A multipath channel was simulated using a discrete number of paths having fixed amplitudes chosen from a particular power delay profile. The paths were chosen to be equidistant from each other. In addition to multipath, AWGN (Additive White Gaussian Noise) was used as an interference source.

In the following tables, experimental results are indicated in the form X/Y, where X is the number of missed detections and Y is the number of false alarms. In each experiment 10 TDMA frames were generated and frame/slot synchronization was attempted. At the end of each run, a result of false alarm, missed detection or success was recorded. A dash indicates that the data were not available.

Table 1 represents the performance under different values of delay spreads. A static two ray channel was used, where the effects of Rayleigh fading and Doppler shifting were ignored. Both rays in the multipath model were set to have equal amplitudes. Delay is measured in samples per symbol. Thus, a delay of 10 samples corresponds to a delay of $\frac{1}{2}$ symbol. The Signal-to-Noise Ratio (SNR), representing Eb/No (energy per bit to noise spectral density), is indicated in dB. This table does not indicate the location of the detected peak relative to the true peak; however, in general this error is roughly within half of the delay interval.

TABLE 1

| | Performance under Delay Spread | | | | | |
|---|---|---|---|---|---|---|
| delay | 0 | 2 | 4 | 6 | 8 | 10 |
| SNR | | | | | | |
| 21 | 0/0 | 0/0 | 0/0 | 0/0 | 0/0 | 0/0 |
| 18 | 0/0 | 0/0 | 0/0 | 0/0 | 0/0 | 0/0 |
| 15 | 0/0 | 0/0 | 0/0 | 0/0 | 0/0 | 0/0 |
| 9 | 0/0 | 0/0 | 0/0 | 0/0 | 0/0 | 0/0 |
| 6 | 0/0 | 0/0 | 0/0 | 0/0 | 0/0 | 0/0 |

Similar tests were performed with multiple delay paths using different power delay profiles. The results were found to be quite similar in that frame synchronization was never missed. A similar result was observed with fading and Doppler offsets added to the multipath model.

Table 2 indicates the sensitivity of the method to carrier frequency offset expressed in Hertz. No effect of fading was included. It can be seen that frame synchronization is readily obtained for frequency offsets up to approximately 400-500 Hz, except in very noisy conditions. The typical values of carrier frequency offset to be expected in the U.S. digital cellular system are not more than 250 Hz.

TABLE 2

| | Performance under Carrier Frequency Offset | | | | | | |
|---|---|---|---|---|---|---|---|
| freq | 0 | 100 | 200 | 300 | 400 | 500 | 600 |
| SNR | | | | | | | |
| 21 | 0/0 | 0/0 | 0/0 | 0/0 | 0/0 | 7/10 | 10/— |
| 18 | 0/0 | 0/0 | 0/0 | 0/0 | 0/0 | 6/0 | 10/— |
| 15 | 0/0 | 0/0 | 0/0 | 0/0 | 0/0 | 8/0 | 10/— |
| 12 | 0/0 | 0/0 | 0/0 | 0/0 | 0/0 | 10/— | 10/— |
| 9 | 0/0 | 0/0 | 0/0 | 0/0 | 5/0 | 9/0 | 10/— |
| 6 | 0/0 | 0/0 | 0/0 | 5/0 | 10/— | 10/— | 10/— |

It should be noted that the frame/slot synchronization method and apparatus of the invention is applicable to other TDMA systems, such as trunked mobile radio TDMA systems employing a 25 KHz channel. The teaching of the invention is also applicable to TDMA systems having more or less than six slots per frame.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for applying frame/slot synchronization to a Time Division Multiple Access (TDMA) signal, comprising the steps of:
   a) receiving the TDMA signal;
   b) acquiring a temporal position of a reference feature associated with a desired time slot by determining a normalized cross-correlation T(n) between a predetermined bit sequence and a received bit sequence in accordance with the expression:

$$T(n) = \frac{\left| \sum_{k=0}^{N-1} R(n+k) S_i^*(k) \right|^2}{\sum_{k=0}^{N-1} |R(n+k)|^2 \sum_{k=0}^{N-1} |S_i(k)|^2}$$

where R(n+k) is a complex signal consisting of in-phase and quadrature samples derived from the received signal, $S_1(k)$ is a predetermined symbol sequence of the $i^{th}$ time slot, N is a number of samples used over the predetermined symbol sequence, and the symbol * represents complex conjugate, the desired time slot being one time slot of a plurality of time slots that comprise a frame;
   c) verifying that the acquired temporal position corresponds to the desired time slot, the step of verifying including the repetitively executed steps of,
      1. estimating a temporal position of the reference feature in a subsequent frame; and
      2. sampling the subsequent frame at the estimated temporal position to determine if the reference feature is present;
   d) maintaining synchronization by
      1. estimating, over a plurality of received frames, the temporal position of the reference feature of the desired time slot by determining the normalized cross-correlation between the predetermined bit sequence and the received bit sequence within a neighborhood of samples obtained both prior to and subsequent to the estimated temporal slot position of the reference feature; and
      2. adjusting the estimated temporal slot position for each frame.

2. The method of claim 1 including, if the reference feature is not located at the estimated temporal position during the step of maintaining synchronization, the further step of estimating the temporal position of the reference feature in a subsequent frame from the location of the reference feature in a previous frame.

3. The method of claim 2 including, if the reference feature is not located after a predetermined number of frames have occurred, the further step of reestablishing frame/slot synchronization by re-executing the steps of acquiring and verifying.

4. The method of claim 1 wherein the step of maintaining synchronization includes the step of locating $N_1$ correlation peaks in succession at predetermined correlation peak locations.

5. The method of claim 1 wherein the step of maintaining synchronization includes the step of locating $N_1$ correlation peaks out of $N_2$ correlation peaks at predetermined correlation peak locations.

6. Apparatus for applying frame/slot synchronization to a Time Division Multiple Access (TDMA) signal, comprising:
   a) means for receiving the TDMA signal;

b) means for acquiring a temporal position of a reference feature associated with a desired time slot, the desired time slot being one time slot of a plurality of time slots that comprise a frame, the acquiring means also verifying that the acquired temporal position corresponds to the desired time slot, the acquiring means including means for estimating a temporal position of the reference feature in a subsequent frame and means for sampling the subsequent frame at the estimated temporal position to determine if the reference feature is present; and c) means for estimating, over a plurality of received frames, synchronization to the temporal position of the reference feature of the desired time slot, the estimating means including a means for locating $N_1$ correlation peaks in succession at predetermined correlation peak locations, $N_1$ being a desired number of found peaks; and d) means for adjusting the estimated temporal slot position for each frame.

7. Apparatus as set forth in claim 6 wherein the means for acquiring a temporal position includes means for determining a normalized cross-correlation T(n) between a predetermined bit sequence and a received bit sequence in accordance with the expression:

$$T(n) = \frac{\left|\sum_{k=0}^{N-1} R(n+k)S_i^*(k)\right|^2}{\sum_{k=0}^{N-1}|R(n+k)|^2 \sum_{k=0}^{N-1}|S_i(k)|^2}.$$

where R(n+k) is a complex signal consisting of in-phase and quadrature samples derived from the received signal, $S_i(k)$ is a predetermined symbol sequence of the $i^{th}$ time slot, N is a number of samples performed over the predetermined bit sequence, and the symbol * represents complex conjugate.

8. Apparatus as set forth in claim 6 wherein the means for receiving comprises means for receiving and demodulating an RF signal to obtain in-phase and quadrature signals therefrom.

9. A method for applying frame/slot synchronization to a Time Division Multiple Access (TDMA) RF signal for a digital cellular radio telephone system, comprising the steps of:

a) receiving the TDMA RF signal; and b) demodulating the TDMA RF signal by the steps of 1. acquiring a temporal position of a predetermined synchronizing bit sequence associated with a desired time slot by determining a normalized cross-correlation T(n) between the predetermined bit sequence and a received bit sequence by comparing a value of the normalized cross-correlation T(n) to a threshold value, being in the range of 0.4 to 0.8, to ascertain that the predetermined bit sequence of the desired time slot has been located if the value of the determined normalized cross-correlation T(n) exceeds the threshold value, the desired time slot being one of a plurality of time slots that comprise a frame;

2. verifying that the acquired temporal position corresponds to the desired time slot by repetitively estimating a temporal position of the bit sequence in a subsequently received frame; and 3. sampling the subsequently received frame at the estimated temporal position to obtain the normalized cross-correlation T(n) between the predetermined bit sequence and the received bit sequence to determine if the predetermined synchronizing bit sequence is present.

10. The method of claim 9 including the further step of estimating, over a plurality of received frames, the temporal position of the predetermined synchronizing bit sequence relative to the frame, and adjusting the estimated temporal slot position for each frame.

11. The method of claim 10 wherein the step of maintaining includes the step of determining a normalized cross-correlation T(n) between the predetermined synchronizing bit sequence and the received bit sequence within a neighborhood of samples prior to and subsequent to an estimated temporal position of the synchronizing bit sequence.

12. The method of claim 9 wherein the step of determining the normalized cross-correlation T(n) between the predetermined synchronizing bit sequence and the received bit sequence is accomplished in accordance with the expression:

$$T(n) = \frac{\left|\sum_{k=0}^{N-1} R(n+k)S_i^*(k)\right|^2}{\sum_{k=0}^{N-1}|R(n+k)|^2 \sum_{k=0}^{N-1}|S_i(k)|^2}.$$

where R(n+k) is a complex signal consisting of in-phase and quadrature samples derived from the received signal, $S_i(k)$ is a predetermined symbol sequence of the $i^{th}$ time slot, N is a number of samples performed over the predetermined bit sequence, and the symbol * represents complex conjugate.

* * * * *